United States Patent Office 2,902,610
Patented Sept. 1, 1959

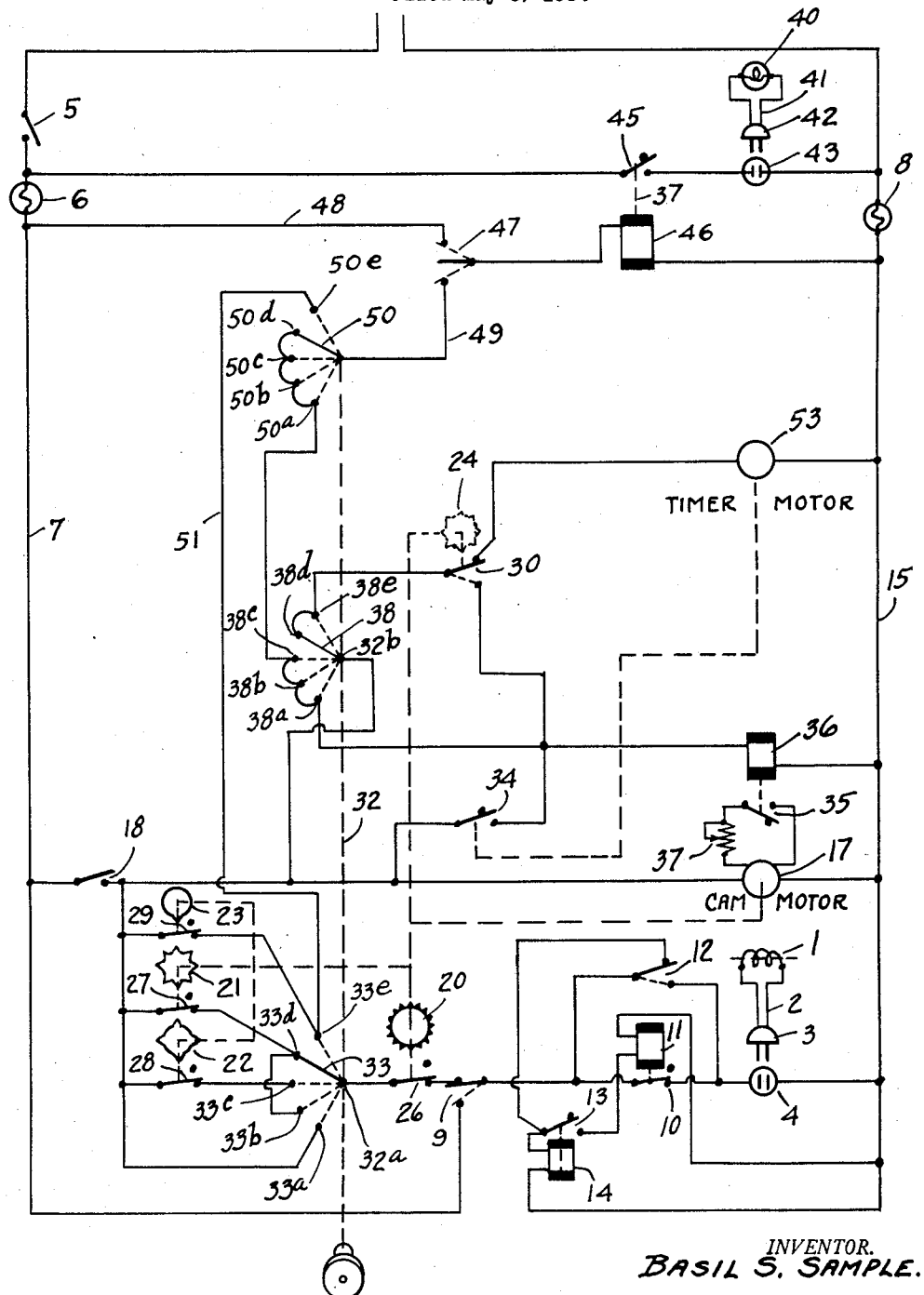

2,902,610

PULSE GENERATING SYSTEM

Basil S. Sample, Danville, Ill.

Application May 3, 1954, Serial No. 426,993

8 Claims. (Cl. 307—106)

This invention relates generally to camera control systems, and more particularly to systems for timing periodic operation of a camera shutter film feed mechanism and/or cooperating illuminating devices.

A conventional motion picture camera of the "amateur type" is commonly powered by means of a spring motor which may be wound manually. The motor functions to operate a shutter and to advance the film after each operating cycle of the shutter. A camera of this type also may include a manually operable release button in addition to that which controls the motor which may be so arranged that each operation thereof moves the shutter through a single operating cycle and also advances the film one frame for each shutter operating cycle. Certain conventional "snapshot" cameras also include a release button adapted not only to control the shutter but also to advance the film after each shutter operating cycle. Motion picture cameras of the type described, and possibly "snapshot" cameras of the type described, may be utilized for taking photographs at fixed time intervals for the purpose of making studies of different kinds relative to the growth of plants or other natural phenomena which occurs over long periods of time. Such cameras may also be used for taking periodic photographs of corrosion effects, fatigue of metals, meter indications, burglar protection or various other phenomena.

The principal object of this invention is to provide an electrical control system operable to generate pulses of constant time duration at predetermined time intervals and wherein said control system may be adjusted for varying the length of said time intervals over a substantial range.

Another object of this invention is to provide, in association with a camera having film feed and shutter control mechanism, an electrically operated control system adapted to operate the film feed and shutter control mechanism at timed intervals.

Another object of this invention is to provide, in association with a camera film feed and shutter mechanism, an electrical control system operable manually or automatically to operate the camera shutter and film feed mechanism by electrical pulses of predetermined time duration and at predetermined time intervals.

Still another object of this invention is to provide in association with a camera film feed and shutter control mechanism, a remote control system operable manually or automatically to actuate film feed and shutter mechanism together with associated illuminating devices at predetermined intrevals.

A further object of this invention is to provide, in association with a camera shutter and film feed control mechanism, an electrical control system wherein the shutter and film feed may be operated automatically at predetermined time intervals and wherein adjustments may be made for varying said time intervals over a substantial range.

A still further object of this invention is to provide an electrical pulse generating circuit adapted to receive a triggering pulse of any desired duration and to generate an electrical pulse in response thereto of fixed, predetermined time duration.

A still further object of this invention is to provide an electrical control system for motion picture cameras adapted to cooperate with either a camera having only an exposure button for starting and stopping the camera driving motor or with cameras having a single frame release button.

In accordance with this invention there is provided an electrical control system for cameras comprising a pulse generating circuit adapted to apply an electrical impulse of fixed time duration to a shutter and film feed control mechanism, and a timing circuit for triggering said pulse generating circuit at predetermined intervals, said timing circuit including means for adjusting the time interval between successive control pulses.

In accordance with another feature of this invention there is provided an electrical control system including a timing circuit means for applying pulses to actuate a camera control mechanism at predetermined time intervals, and circuit means associated with said timing circuit means for effecting multiplication of the said time intervals.

In accordance with still another feature of this invention there is provided a pulse generating or timing circuit including a pulse initiating means and a pulse terminating means controlled thereby for providing successive pulses of constant time duration.

In accordance with a further feature of this invention there is provided an electrical control system for cameras comprising a timing circuit for applying pulses of relatively long duration to actuate a single-frame release button in a motion picture camera, and a pulse timing circuit cooperating with said timing circuit for limiting the duration of pulses in its output to a relatively short time duration for actuating an exposure button of a motion picture camera.

The full nature of the invention will be understood from the accompanying drawings and the following description and claims:

The figure of the drawing is a circuit diagram illustrating the electrical control system provided in accordance with this invention.

In accordance with this invention there is provided an electrical control system which may be associated with any conventional camera having an exposure button for contacting the camera motor or a single-frame release button adapted to operate a camera shutter and film feed mechanism through a single shutter opening and closing cycle and a single film frame advancing cycle. Thus, the system may be adapted to control a conventional motion picture camera driven by a spring motor or a conventional "snapshot" camera having a single push button control mechanism for opening and closing the shutter and subsequently advancing the film by a single frame. It will be obvious to those skilled in the art that the conventional motion picture camera can hold a much greater length of film than the conventional snapshot camera and, consequently, the motion picture camera can be operated to take a much longer series of individual pictures.

For operating a shutter and film feed mechanism in a conventional camera there is provided a solenoid 1, the armature of which may be arranged to operate the exposure button or the single-frame release button of the camera. Solenoid 1 may be connected by means of conductors 2 to a plug 3 adapted to be inserted in an electrical socket 4 mounted in the casing of the control device. The socket 4 may be energized from a conventional power line through an on-off switch 5, a fuse 6, a manually operable, normally open switch 9 and normally closed contacts 10 of a relay 11. The contacts 10 may be shunted by a manually operable, single pole, double throw switch 12. One contact of switch 12 may be connected to the plug 4 while the other contact may be connected to a relay contact 13, and also to its operating winding 14. Winding 14 may be connected to the ground line 15 while the main contact of relay 14 may be connected to the winding of relay 11, which in turn may also be connected to ground line 15.

Relays 11 and 14 may be utilized to provide impulses of relatively short duration across solenoid 1 for operating the exposure button of a camera. For example, switch 9 may be manually operated to connect a high line 7 through relay contacts 10 to the solenoid 1. With switch 12 in the full line position, relay 14 will be energized simultaneously, thereby to actuate its contact 13 and energize relay 11. As soon as relay 11 is energized, its contact 10 will open, thereby to terminate the pulse on solenoid 1. Thus, it will be seen that the duration of the pulse impressed on solenoid 1 is determined by the time interval required for relays 11 and 14 to actuate their respective armatures. Preferably, this circuit should be designed according to the camera speed. For example, if the camera speed is sixteen frames per second, the solenoid 1 should receive a pulse of about one-sixteenth of a second in duration, thereby to advance the film one frame at a time.

From the foregoing it will be apparent that switch 9 may be closed manually to the dotted line position for applying control impulses to the solenoid 1 and these impulses will be of constant time duration regardless of the time duration of closure of switch 9. Furthermore, the pulse timing or generating circuit may be disabled by closing switch 12 to the dotted line position, thereby opening the operating circuits of relays 11 and 14 and shunting the contacts 10 of relay 11. In this manner pulses of any desired time duration may be applied to the solenoid 1.

For automatically applying pulses to solenoid 1 at predetermined time intervals, there is provided a cam operating motor 17 connected to lines 7 and 15 by means of a manually operable control switch 18. Cam motor 17 is provided with a plurality of switch actuating cams 20, 21, 22, 23 and 24. The cam 20 is provided with sixteen lobes adapted to actuate switch 26, whereby switch 26 opens and closes sixteen times for each revolution of the cam. Cam 21 is provided with eight lobes for actuating switch 27. Cam 22 is provided with four lobes for actuating switch 28. Cam 23 is provided with one lobe for actuating switch 29, and cam 24 is provided with eight lobes for actuating switch 30. Thus, each of the cams 20, 21, 22, 23 and 24 are adapted to operate their respective switches a number of times corresponding to the number of lobes on each cam during one revolution thereof. All of these cams are on a common shaft connected to cam motor 17.

For connecting the switches 27, 28 and 29 with switch 26 there is provided a gang switch 32, the bank 32a of which includes a switch arm 33 and contacts 33a connected to switch 18, contacts 33b connected to switch 27 and contacts 33c connected to switch 28. Switch bank 32a also includes contacts 33d connected in common with contacts 33b to switch 27 and contact 33e connected directly to switch 29.

For controlling the operation of cam motor 17 there is provided a control circuit including contacts 35 of a relay 36 and a potentiometer 37 connected to a winding of motor 17. The motor 17 is a conventional motor having windings such that when contacts 35 are open, the motor will not run, whereby closure of contacts 35 in effect energizes the motor. The potentiometer 37 may be adjusted to vary the speed of cam motor 17. For controlling energization of motor 17 there is provided a relay 36 connected at one side to the ground line 15 and on the other side to bank 32b of gang switch 32. Gang switch 32b includes a switch arm 38 and the contacts 38a, 38b, 38c, 38d and 38e. Contacts 38a, 38b and 38c are tied together, and switch arm 38 is connected to switch 18 whereby when gang switch 32 is positioned on any of the a, b or c contacts, relay 36 can be energized by closure of switch 18.

Let it be assumed that switch 9 is in its full line position and switch 12 is in its dotted line position. To operate a camera shutter and film feeding mechanism under the control of cam motor 17, switch 18 may be closed and gang switch 32 may be positioned in its "a" position, for example. Switch arm 33 will then be connected with switch 18. Let it further be assumed that the cam motor 17 rotates the cams through one revolution in twenty seconds. Cam 20 having sixteen lobes thereon will open and close switch 26 at the rate of once each one and one quarter seconds. Therefore, a circuit will be established from line 7 through switch 18, contact 33a, arm 33, switch 26, switch 9 and the impulse timing circuit to energize solenoid 1 with a pulse of constant duration every one and one quarter seconds. Solenoid 1 opens the camera shutter and feeds a film frame during each one and one quarter second period.

It will be understood that solenoid 1 may be positioned, relative to a camera, to operate either its single frame release button or its exposure button. As explained before, relays 11 and 14 are arranged to provide a pulse of one sixteenth second in duration. Therefore, switch 12 should be adjusted to its full line position when the solenoid 1 is arranged to operate the exposure button, thereby to provide a short pulse. A longer pulse can be used for operating a single frame release button and consequently cam 20 and switch 26 can be arranged to provide a pulse of three sixteenths second in duration, and switch 12 can be adjusted to the dotted line position when automatic timing is desired.

In order to change the time interval between pulses applied to solenoid 1, switch 32 may be adjusted to its "b" position wherein switch arm 33 is connected with switch 27 operated by cam 21. This cam is provided with eight lobes, whereby switch 27 opens and closes at the rate of once each two and one half seconds. Meanwhile, cam 20 operates switch 26 once each one and one quarter seconds, but the shape and location of the lobes on cam 21 may be designed to close switch 27 for a longer period than the period of closure of switch 26 to produce a single pulse. Therefore, cam 21 may be so adjusted on its shaft that switch 27 will close before switch 26 closes and open after switch 26 opens. Therefore, closure of switch 27 selects that closure of switch 26 which will apply current to relays 11 and 14. Therefore, a pulse is applied to solenoid 1 each two and one half seconds instead of each one and one quarter seconds.

If gang switch 32 is adjusted to its "c" position, switch 28 becomes effective. Since this cam has only four lobes, switch 28 closes once during each period of five seconds and thereby renders switch 26 effective once for each five seconds and is thereby operative to energize solenoid 1 once each five seconds.

It will be understood that the shape and adjustment of the lobes on cams 21 and 22 are such that switches 27 and 28 will be closed for a longer time than the period of closure of switch 26. Therefore, solenoid 1 is always energized for the same period of time. It will further be understood that cam motor 17 runs continuously when the gang switch 32 is adjusted to the "a," "b" or "c" positions, and the period of time between pulses to solenoid 1 is determined by the setting of gang switch 32.

In order to provide illumination of a subject during the time that the camera shutter is opened, there is provided an electrical flood lamp 40 which may be connected by a line 41 to a plug 42. A socket 43 may be provided in the case of a control box which may in turn be connected to switch 5 in line 15 through a relay contact 45. While a single flood lamp is illustrated in the drawing, it will be understood that any desired number of lamps may be connected to plug 42. For controlling contact 45 there is provided a relay 46 connected to a manually operable switch 47 and to line 15. One contact of switch 47 may be connected through line 48 to line 7, while the other contact thereof may be connected through line 49 to the switch arm 50 of gang switch 32. Contacts 50a, 50b, 50c and 50d of gang switch 32 may be connected in multiple to contacts 38a, 38b and 38c. Contact 50e of gang switch 32 may be connected through line 51 with contact 33e. Thus, switch 47 may be moved from the "off" position and connected to line 48 to energize relay 46 and close contact 45 for energizing lamp 40 for any desired period of time. When the switch 47 is connected to line 49, the relay 46 will be controlled from the automatic timing portion of the circuit.

For providing further variation of the time periods of operation of solenoid 1, there is provided a timer motor 53. This may be a conventional timing device wherein the motor operates at a constant speed when energized. Operation continues until an element connected with the shaft of the motor reaches a stop, at which time the motor stops rotating and remains in position until the current is cut off. A spring is provided for returning the motor to its starting position whenever the current is cut off. The starting position of the motor is adjustable and, therefore, the length of time required for the motor to run from its starting position to its stop position may be varied at will.

Motor 53 operates, at its stop position, a timer switch 34, connected on one side to switch 18 and on the other side to the cam motor control relay 36, the dotted line contact of switch 30, and to contact 38a.

In order to actuate timer motor 53, gang switch 32 may be moved into its "d" position, whereby current may flow from switch 18 to switch arm 38 of gang switch 32, from contact 38d through switch 30 to timer motor 53. The motor rotates to its stop position, closing switch 34, thereby energizing relay 36 to start cam motor 17. As motor 17 operates, cam 24 moves switch 30 to the dotted line position, thereby to establish a holding circuit from switch 18 through switch arm 38 to control relay 36. When switch 30 moves to the dotted line position, timer motor 53 is de-energized, whereby it returns to its starting position. This causes contact 34 to open, but relay 36 remains energized through the newly established holding circuit through switch arm 38.

Meanwhile, the floodlight control relay 46 is energized when timer motor contact 34 is closed. Accordingly, the floodlamp is illuminated before a pulse is transmitted to solenoid 1. Cam motor 17 operates cam 21 to close switch 27. When switch 27 closes, it operates as described before in connection with the "b" position of gang switch 32 and in cooperation with switch 26 transmits a pulse to solenoid 1 to open and close the camera shutter.

When switch 26 opens, current is cut off from the pulse timer circuit and then further rotation of the cams causes switches 27 and 30 to return to their full line position. Relay 46 is de-energized whereby the floodlamp 40 is de-energized after the solenoid has been de-energized. Switch 30 also functions to disconnect cam motor control relay 36, stopping cam motor 17 and terminating a shutter operating cycle.

Return of switch 30 to its full line position again energizes timer motor 53 which runs through its cycle to its stopping point, thereby to again close switch 34 to initiate a second shutter operating cycle. By adjusting the starting position of the timer motor, the time period between shutter operations may be varied. For example, the motor may be adjustable to run for a period varying between six seconds and one hundred and twenty seconds. In this manner wide variations in the shutter operating period are obtainable.

When gang switch 32 is moved to its "e" position, the shutter timing cycle is similar but occurs only after a longer period of time. When gang switch 32 is in the "e" position, a circuit is completed from switch 18 through switch arm 38 to switch 30 and timer motor 53. When motor 53 reaches its stop position and closes switch 34, cam motor 17 will operate as previously described. As soon as motor 17 has rotated through a small angle, switch 30 is moved to the dotted line position, disconnecting timer motor 53 and allowing it to return to its starting position to open switch 34 as previously described. Motor 17 continues to run due to the newly established circuit through switch 30.

Meanwhile, cam 23, having a single lobe thereon, will operate switch 29 only once during each revolution of the cam motor 17. If the cam is in position to operate switch 29, current will flow through line 51, switch arm 50, the switch 47, and relay 46, thereby to energize floodlamp 40. Immediately thereafter, switch 26 closes as described before to apply current to solenoid 1. Switch 26 immediately opens, cutting off current to solenoid 1, and then switch 29 opens to effect de-energization of relay 46 to de-energize floodlamp 40. Cam 24 then operates to move switch 30 to the full line position, de-energizing relay 36 and stopping cam motor 17, whereby the timer motor is again started.

However, the cams have rotated during this cycle only one eighth of a revolution. Therefore, timer motor 53 will repeat its cycle, and cam motor 17 will again be started. Switch 29 will not be closed and, therefore, there can be no pulse transmitted to solenoid 1 and no illumination of the lamp 40. Therefore, the timer motor 53 will be operated through seven more cycles before the single lobe on cam 23 will again be in position to close switch 29. In this manner the period between solenoid impulses will be eight times the period of time for which the timer motor adjustment is set.

For example, if the timer motor interval is adjustable from six seconds to two minutes, the interval between shutter impulses can be as long as eight times two minutes, or a maximum of sixteen minutes between shutter and flood lamp operations. It will be understood that the number of lobes on cam 24 may be varied as desired, whereby the number of cycles of the timer motor and cam motor between solenoid and lamp impulses can be selected as four, ten or any other desired or practical number of times.

While the control system embodying this invention has been described as energizing an illumination circuit prior to shutter operation and de-energization of the illumination circuit subsequent to shutter operation, it will be apparent to those skilled in the art that in some applications of this invention it will be desirable to open the camera shutter prior to energization of the light source and to close the shutter subsequent to energization of the light source. When it is desired to operate the system in this fashion, plug 3 connected to solenoid 1 may be inserted in socket 43, while plug 42 connected to light source 40 may be inserted in socket 4.

From the foregoing description it will be apparent that this invention provides an electrical timing system for cameras wherin a pulse of predetermined duration may be applied to a shutter operating solenoid. The invention further provides means for applying said pulses at widely variable time intervals whereby a camera shutter can be operated to take successive pictures at substantially any desired time interval. The invention also provides switching means in conjunction with said timing system for controlling illuminating devices whereby the object to be photographed can be illuminated at the time that the camera shutter is operated or the switching means may be operated manually to provide illumination as desired.

While this invention has been disclosed in connection with the timed operation of a camera shutter, it will be readily understood that the system can be applied as a timing control system for many other types of devices.

The invention claimed is:

1. A pulse generating circuit comprising a source of potential, a pulsing switch connected in series with said source, a cam operatively associated with said pulsing switch having a plurality of switch closing lobes for opening and closing said pulsing switch at a predetermined frequency, a plurality of connector switches connected in multiple with said source, each connector switch having associated therewith a cam provided with a number of lobes for opening and closing each connector switch at a frequency lower than that of said pulsing switch closure of said connector switch being for a longer period than the period of closure of said pulsing switch, a motor connected to said cams for rotating all of them at the same rate, and a selector switch including a switch arm connected to said pulsing switch and a plurality of contacts selectively connectable with said arm, one of said contacts being connected directly with said source, and the others of said contacts being each connected with one of said connector switches whereby said selector switch may be positioned to connect said source or any desired connector switch with said pulsing switch, to render the pulsing switch operative to produce electrical pulses at a selected one of said lower frequencies.

2. A pulse generating circuit comprising a source of potential, a pulsing switch connected in series with said source, a rotatable cam operatively associated with said pulsing switch having a plurality of switch closing lobes for opening and closing said pulsing switch at a predetermined frequency, a plurality of connector switches connected in multiple with said source, each connector switch having associated therewith a cam provided with a number of lobes for opening and closing each connector switch at a frequency lower than that of said pulsing switch closure of said connector switch being for a longer period than the period of closure of said pulsing switch, and a selector switch connected to said pulsing switch, said source, and with each one of said connector switches whereby said selector switch may be positioned to connect said source or any desired connector switch with said pulsing switch, to render the pulsing switch operative to produce electrical pulses at a selected one of said lower frequencies.

3. A pulse generating circuit comprising a source of potential, a pulsing switch connected to said source, means operatively associated with said pulsing switch for opening and closing said pulsing switch at a predetermined frequency, a plurality of connector switches, each connector switch having operatively associated therewith means for opening and closing each connector switch at a frequency lower than that of said pulsing switch closure of said connector switch being for a longer period than the period of closure of said pulsing switch, and a selector switch connected with said source, said pulsing switch and said connector switches whereby said selector switch may be positioned to connect any desired connector switch with said pulsing switch, to render the pulsing switch operative to produce electrical pulses at a selected one of said lower frequencies.

4. A pulse generating circuit comprising a source of potential, a pulsing switch connected to said source, means operatively associated with said pulsing switch for opening and closing said pulsing switch at different predetermined frequencies, a plurality of connector switches, each connector switch having operatively associated therewith means for opening and closing each connector switch at different frequencies lower than that of said pulsing switch closure of said connector switch being for a longer period than the period of closure of said pulsing switch, and a selector switch connected to said pulsing switch, said source, and said connector switches whereby said selector switch may be positioned to connect any desired connector switch with said pulsing switch, to render the pulsing switch operative to produce electrical pulses at a selected one of said lower frequencies.

5. A pulse generating circuit comprising a multi-switch circuit for selectively generating pulses of different frequencies and including a variable speed motor operative continuously for operating each of said switches at a different rate and controlling the frequency of generated pulses within a certain frequency range and a manually operable selector switch for energizing one of said switches to determine the frequency of said pulses within said range, a timer motor operable through a single cycle and including switch means for starting said variable speed motor at the end of said cycle, and switch means controlled by said variable speed motor for periodically stopping itself and starting said timer motor through its cycle to provide periodic operation of said variable speed motor, thereby to further vary the frequency range of said circuit.

6. A pulse generating circuit comprising a multi-switch circuit for selectively generating pulses of different frequencies and including a first motor operative continuously for operating each of said switches at a different rate and controlling the frequency of generated pulses within a certain frequency range and a manually operable selector switch for energizing one of said switches to determine the frequency of said pulses within said range, a timer motor including switch means for starting said first motor periodically, and switch means controlled by said first motor for periodically stopping itself and starting said timer motor to provide periodic operation of said first motor, thereby further to vary the frequency range of said circuit.

7. A pulse generating circuit comprising a multi-switch circuit for selectively generating pulses of different frequencies and including a variable speed motor operative continuously for operating each of said switches at a different rate and controlling the frequency of generated pulses within a certain frequency range and a manually operable selector switch for energizing one of said switches to determine the frequency of said pulses within said range, a timer motor operable through a single cycle and including switch means for starting said variable speed motor at the end of said cycle, and switch means controlled by said variable speed motor for periodically stopping itself and starting said timer motor through its cycle to provide periodic operation of said variable speed motor, thereby further to vary the frequency range of said circuit.

8. A pulse generating circuit comprising a multi-switch circuit for selectively generating pulses of different frequencies and including a first motor operative continuously for operating each of said switches at a different rate and controlling the frequency of generated pulses within a certain frequency range and a manually operable selector switch for energizing one of said switches to determine the frequency of said pulses within said range, a timer motor operable through a single cycle and including means for varying the duration of said cycle, switch means controlled by said timer motor for starting said first motor at the end of said cycle, and switch means controlled by said first motor for periodically stopping itself and starting said timer motor to provide periodic operation of said first motor, thereby further to vary the frequency range of said circuit.

References Cited in the file of this patent

UNITED STATES PATENTS

| | | |
|---|---|---|
| 1,524,187 | Lowen | Jan. 27, 1925 |
| 1,563,488 | Hoge | Dec. 1, 1925 |
| 2,290,626 | Bosomworth | July 21, 1942 |
| 2,300,838 | Dicke | Nov. 3, 1942 |
| 2,346,079 | Newton | Apr. 4, 1944 |
| 2,538,577 | McCarty | Jan. 16, 1951 |
| 2,620,713 | Gardner | Dec. 9, 1952 |
| 2,637,835 | Davidson | May 5, 1953 |
| 2,664,795 | Tone | Jan. 5, 1954 |